United States Patent [19]

Dick

[11] Patent Number: 4,569,007

[45] Date of Patent: Feb. 4, 1986

[54] HEADLAMP

[75] Inventor: Heinz Dick, Odenthal, Fed. Rep. of Germany

[73] Assignee: Ford Motor Company, Dearborn, Mich.

[21] Appl. No.: 513,559

[22] Filed: Jul. 14, 1983

Related U.S. Application Data

[63] Continuation of Ser. No. 316,264, Oct. 29, 1981, abandoned.

[51] Int. Cl.⁴ .................... F21V 29/00; F21V 13/04; B60Q 1/04
[52] U.S. Cl. ..................................... 362/294; 362/61; 362/82; 362/218; 362/287; 362/290; 362/296; 362/307; 362/310; 362/311; 362/373
[58] Field of Search .............. 362/61, 64, 66, 80, 362/82, 83, 158, 257, 267, 285, 290, 294, 296, 306, 307, 310, 311, 322, 341, 351, 345, 373, 277, 282, 283, 284, 286, 287, 289, 308, 148, 218, 309, 223

[56] References Cited

U.S. PATENT DOCUMENTS

| | | | |
|---|---|---|---|
| 1,697,216 | 1/1929 | Wuelker | 362/294 X |
| 1,900,539 | 3/1933 | Brady | 362/294 |
| 1,940,482 | 12/1933 | Arras | 362/267 |
| 2,021,790 | 11/1935 | Kuhn | 362/290 |
| 2,354,804 | 8/1944 | Falge et al. | 362/294 |
| 3,375,773 | 4/1968 | Wotowiec et al. | 362/294 X |
| 3,465,141 | 9/1969 | Schiffer | 362/294 |
| 3,555,267 | 1/1971 | Sutter | 362/294 |
| 4,196,459 | 4/1980 | Dick | 362/307 X |
| 4,224,551 | 9/1980 | Liebegott | 362/61 X |
| 4,249,232 | 2/1981 | Dick | 362/267 X |
| 4,254,454 | 3/1981 | Hardin | 362/294 X |
| 4,293,897 | 10/1981 | Deverrewaere | 362/284 |
| 4,321,658 | 3/1982 | Deverrewaere | 362/306 X |
| 4,412,275 | 10/1983 | McMahan | 362/83 X |
| 4,414,614 | 11/1983 | McMahan et al. | 362/83 X |

FOREIGN PATENT DOCUMENTS

| | | | |
|---|---|---|---|
| 0013245 | 7/1980 | European Pat. Off. | 362/66 |
| 652581 | 11/1937 | Fed. Rep. of Germany | 362/83 |
| 816083 | 10/1951 | Fed. Rep. of Germany | 362/218 |
| 1035497 | 7/1958 | Fed. Rep. of Germany | 362/83 |
| 1288533 | 2/1969 | Fed. Rep. of Germany | 362/285 |
| 1622036 | 10/1970 | Fed. Rep. of Germany | 362/223 |
| 2605240 | 8/1977 | Fed. Rep. of Germany | 362/80 |
| 1958761 | 11/1978 | Fed. Rep. of Germany | 362/61 |
| 2828280 | 1/1980 | Fed. Rep. of Germany | 362/83 |
| 2732895 | 11/1980 | Fed. Rep. of Germany | 362/80 |
| 3001925 | 7/1981 | Fed. Rep. of Germany | 362/61 |
| 2488556 | 2/1982 | France | 362/82 |
| 506273 | 12/1954 | Italy | 362/83 |
| 197431 | 5/1923 | United Kingdom | 362/285 |
| 2029954 | 3/1980 | United Kingdom | 362/61 |
| 2069120 | 8/1981 | United Kingdom | 362/294 |
| 2089957 | 6/1982 | United Kingdom | 362/61 |

*Primary Examiner*—David H. Brown
*Assistant Examiner*—John E. Griffiths
*Attorney, Agent, or Firm*—Daniel M. Stock; Clifford L. Sadler

[57] ABSTRACT

A headlamp suitable for a motor vehicle comprises a first component part composed of a reflector and a second component part composed of a lens and a rearwardly projecting spacer, the two component parts being connected together by interleaved peripheral webs and channels which form a labyrinth seal preventing ingress of water, but allowing ventilation. Pivot axes are formed by interengaging partly cylindrical formations along the edges of the webs and channels.

5 Claims, 14 Drawing Figures

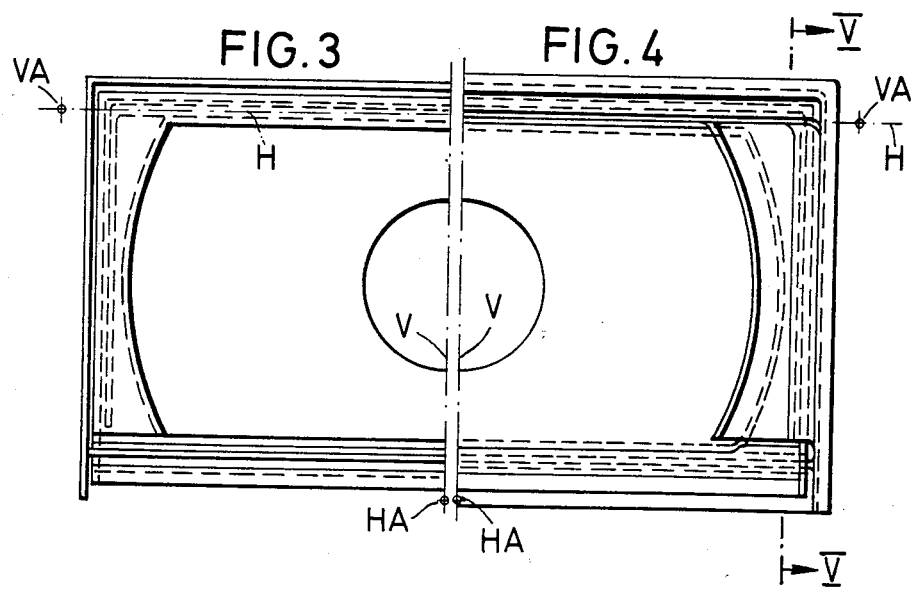
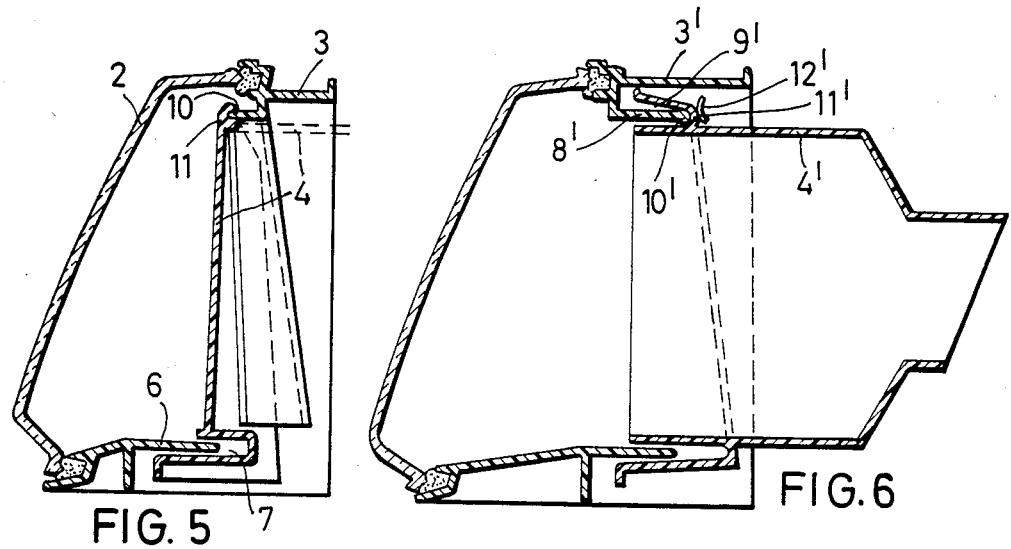
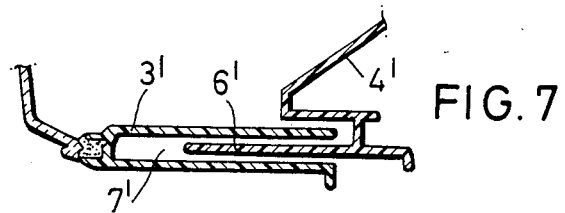

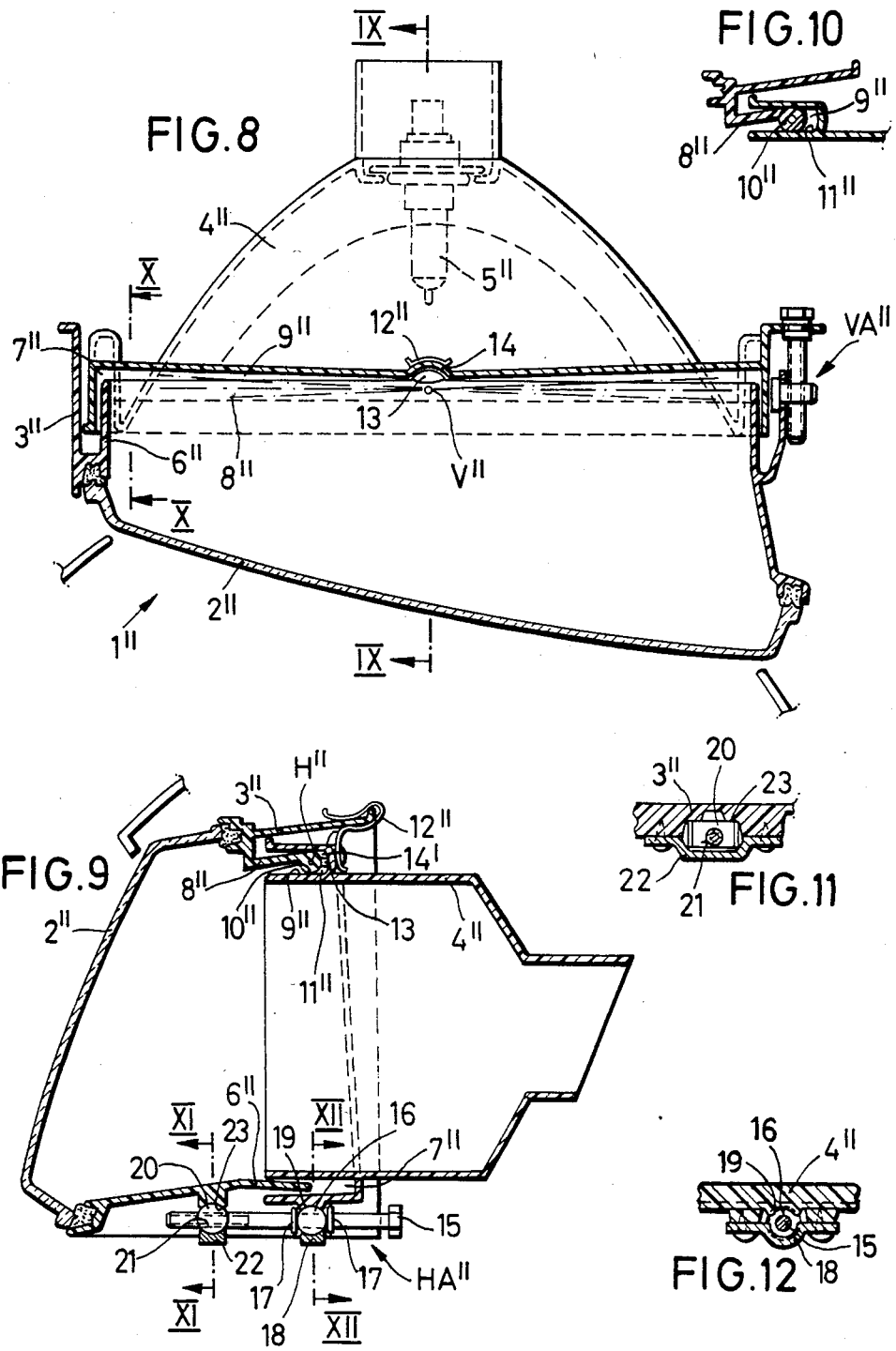

HEADLAMP

BACKGROUND OF THE INVENTION

This is a continuation of Ser. No. 316,264 filed Oct. 29, 1981 now abandoned. The invention relates to headlamps especially for motor vehicles.

German Patent Publication No. DAS-2,732,895 discloses a headlamp comprising a heavier component part consisting of a glass lens and a spacer, and a lighter component part consisting of a reflector and a bulb holder. The two parts are connected to one another by a pivotally movable ring arrangement so as to be movable relative to one another, and the lighter component part is adjustable by adjusting devices fastened to the heavier component part.

This headlamp has the disadvantage that, because of its leakproof construction, special channels have to be provided for ventilating the headlamp interior.

A headlamp of similar design is disclosed in German Patent Publication No. DOS-2,828,280. In this headlamp, parts of the spacer are in the form of bellows to permit adjustment of the reflector in relation to the fixed glass lens.

This headlamp also has the disadvantage that special measures in the form of ventilating channels formed integrally with the lamp holder have to be taken to ventilate the headlamp interior.

Another headlamp of similar design is known from European Patent Publication No. 0,013,245. In this headlamp, the spacer connected to the glass lens is made as a plastic part with an integral reflector, and it is possible to adjust the reflector in relation to the fixed distance piece by a film hinge and a bellows seal.

This headlamp also has the disadvantage that separate devices or measures have to be provided for ventilating the headlamp interior.

SUMMARY OF THE INVENTION

According to the present invention, there is provided a headlamp comprising a first component part having a reflector and a second component part having a lens and a rearwardly projecting spacer characterized in that the two component parts are connected together by interleaved peripheral webs and channels which form a labyrinth seal.

Because the two component parts are connected together by interleaved webs and channels forming a labyrinth seal, the headlamp interior is reliably sealed off against the entry of water and proper ventilation of the headlamp interior is simply ensured.

Preferably webs at the upper and lower peripheral edges of the spacer interact with channels at the corresponding peripheral edges of the reflector, and channels at the side edges on the spacer piece interleave with webs at the corresponding side edges of the reflector so that manufacture of the individual parts, preferably as plastic moldings, and simple assembly and removal of these parts are made possible.

To provide a pivot axis for adjustment, the web along one peripheral edge (e.g., the upper edge) of the spacer or the reflector preferably forms a partially cylindrical edge, and the channel on the corresponding edge of the other of the reflector and the spacer forms a semicylindrical groove within which the edge is received. The components are preferably held in engagement by a spring clip. The horizontal pivot axis for height adjustment of the headlamp is thereby preferably formed in this way.

A pivot axis may also be provided by forming in the center of the web of the reflector or the spacer an arcuate projection, or nose, and, in the center of the corresponding channel in the other of the reflector and spacer, an arcuate cavity in which the projection is received. The projection and the cavity are preferably held in engagement by a spring clip. A vertical pivot axis for lateral adjustment of the headlamp is thereby preferably formed in this manner.

If desired, the spacer may be formed from plastic material in one piece with a plastic front panel of a motor vehicle. For example, grill or blind elements may be provided in the front panel to extend over the lens. The lens itself need not be optically shaped and may be in the form of glass or plastic. A further lens, possibly with optical shaping, may be incorporated within the lamp rearwardly of the first mentioned lens and mounted on the reflector.

BRIEF DESCRIPTION OF THE DRAWINGS

Several specific embodiments of the invention will now be described, by way of example only, with reference to the accompanying drawings, in which:

FIG. 3 shows a view in the direction of the arrow III in FIG. 1;

FIG. 4 shows a view in the direction of the arrow IV in FIG. 1;

FIG. 5 shows a section along the line V—V in FIG. 4;

FIG. 6 shows a second embodiment of the invention similar to that of FIGS. 1-5, but modified at the part contained in the circle VI in FIG. 2;

FIG. 7 shows a third embodiment of the invention similar to that of FIGS. 1 to 6, but modified at the part contained in the circle VII in FIG. 2;

FIG. 8 shows a horizontal section through a fourth embodiment of a headlamp according to the invention;

FIG. 9 shows a section along the line IX—IX in FIG. 8;

FIG. 10 shows a section along the line X—X in FIG. 8;

FIG. 11 shows a section along the line XI—XI in FIG. 9;

FIG. 12 shows a section along the line XII—XII in FIG. 9;

DESCRIPTION OF THE PREFERRED EMBODIMENTS

Figure 1:
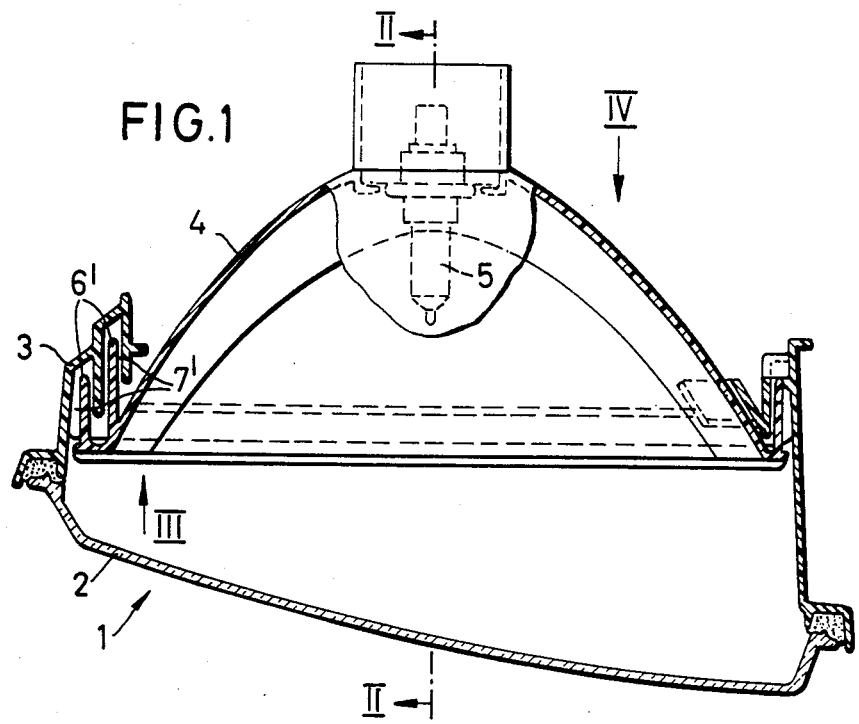
FIG. 1 shows a horizontal section through a first embodiment of a headlamp according to the invention.

A first embodiment of a headlamp according to the invention is illustrated in FIGS. 1 to 5. A headlamp 1 comprises a first, relatively heavy, component part formed by a glass lens 2 and a spacer 3, and a second, relatively light, component part formed by a reflector 4 and a bulb holder 5. The first component part 2, 3 is connected to the second component part 4, 5 by webs 6 and channels 7 made at their peripheral margins which interleave with one another in the manner of a labyrinth seal. The first component part 2, 3 is adjustably connected to the second component part 4, 5 by means of joints formed by a partly cylindrical edge 10 on the forwardly projecting upper horizontal web 8 and a partly cylindrical recess 11 in the corresponding channel 9 in the reflector 4 which are held in engagement by a spring clip 12.

The heavier first component part 2, 3 is fastened, preferably rigidly, to the body of the vehicle, while the lighter second compartment part 4, 5 is fastened to the first part by appropriate adjusting devices, of which the points of engagement and pivot axes are marked in FIGS. 3 and 4, VA and V indicate the vertical adjustment points and axes; HA and H indicate the horizontal adjustment points and axes.

The labyrinth-like engagement of the webs and channels in one another in the region of the lateral peripheral margins can be seen in FIG. 5.

Figure 2:
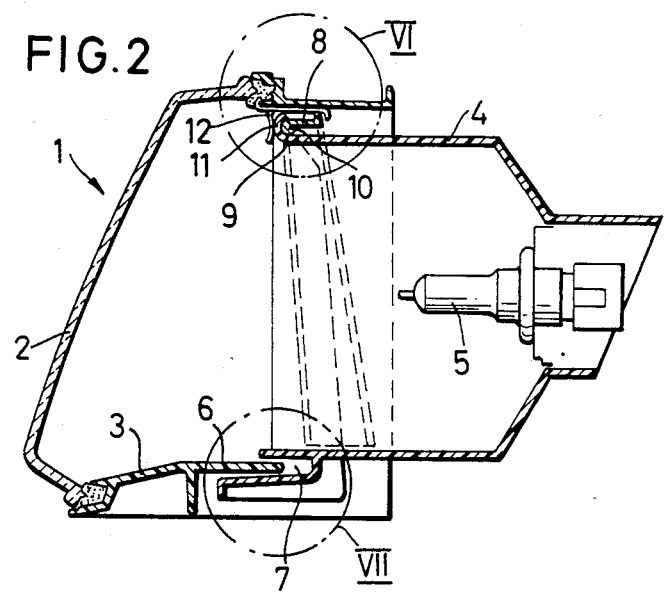
FIG. 2 shows a vertical section along the line II—II in FIG. 1.

In the second embodiment of the invention illustrated in FIG. 6, the construction of FIGS. 1 to 5 has been modified in the region surrounded by the circle VI in FIG. 2. Here, similar parts interacting in a similar way are identified by the same reference numerals as in FIGS. 1 to 5, but supplemented by a dash superscript. The horizontal pivot axis is formed by a web 8' made on the spacer 3' which extends to the rear and carries a partly cylindrical edge 10' which is received in a partly cylindrical recess in the channel 9' of the reflector 4' to form a pivoting hinge 10', 11'. The two parts are retained in engagement by a spring clip 12'.

In the third embodiment of the invention illustrated in FIG. 7, the construction of FIGS. 1 to 5 has been modified in the region surrounded by the circle VII in FIG. 2. Here also parts having the same effect are identified by the same reference numerals provided with a dash superscript. The difference from the embodiment according to FIGS. 1 to 5 is that on the spacer 3' are formed channels 7' which interact with webs 6' made on the reflector 4', so that they engage in one another in the manner of a labyrinth.

FIGS. 8 to 12 show a further embodiment of a headlamp according to the invention, and again, parts having the same effect are identified by the same reference numerals provided with a double dash superscript.

Here, a headlamp 1" consists of a heavier first component part formed by the glass lens 2" and a spacer 3", and a lighter second component part consisting of the reflector 4" and the lamp bulb holder 5".

The two component parts 2", 3" and 4", 5" are connected along their peripheral edges by webs 6" and channels 7", so as to engage in one another in the manner of a labyrinth. The web 8" is provided in its center with a partially cylindrical projection, or nose 13, and the channel 9" is provided with a partially cylindrical cavity 14, which receives the nose 13. The nose 13 is held against and in engagement with the cavity 14 by a spring clip 12" to form the pivoting point of the vertical axis V" for the lateral adjustment VA".

It can be seen from FIG. 9 that the web 8" together with the channel 9" also forms the horizontal pivot axis H" for the height adjustment HA".

It can be seen from FIG. 10 that the edge 10" on the web 8" interacts with the surface 11" of the channel 9" to permit pivoting movement.

Details of the height adjustment HA" are illustrated in FIGS. 11 and 12.

The height adjustment HA" consists advantageously of a screw bolt 15 on which a spherical piece 16 is fixed axially by spring washers 17. This spherical piece is housed in a ball socket 19 formed by a part of the reflector 4" and a shackle 18 fastened thereto. A cylindrical piece 20 is also held longitudinally diaplaceably on the screw bolt 15 by means of a threaded gore extending perpendicularly to the axis of the cylindrical piece, and this cylindrical piece is housed in a cylindrical cup 23 formed by, on one side, the spacer 3" and by a clamp 22 fastened thereto. The adjusting device VA" provided for lateral adjustment can, of course, be designed in a similar way.

Figure 13:
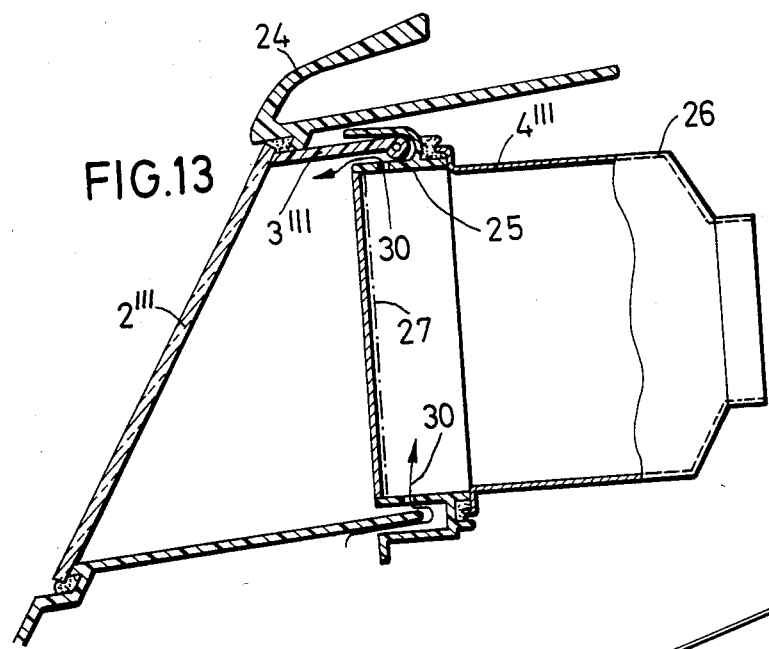
FIG. 13 shows a vertical section through a fifth embodiment of a headlamp according to the invention.
Figure 14:
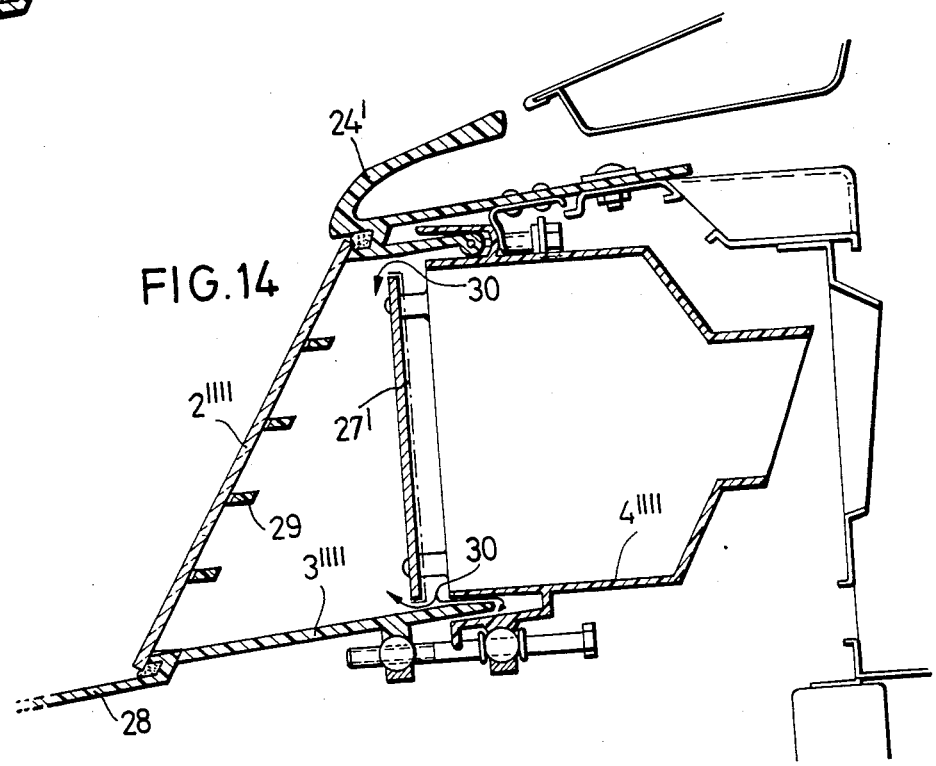
FIG. 14 shows a vertical section through a sixth embodiment of a headlamp according to the invention.

FIGS. 13 and 14 show a further embodiment of a headlamp according to the invention in which a spacer 3''' is made in one piece with a plastic component part forming the front end panel 24 of a motor vehicle body. The reflector 4" can be designed to be a part of composite construction, of which the front part 25 is made of plastic and is connected to a rear part 26 made of sheet metal. The optical ribbing 27 of a lens can be provided in an appropriate way on the front plastic part 25, while the glass pane 2''' remains without optical shaping.

FIG. 14 again shows an embodiment in which a spacer 3'''' is made in one piece with a front end panel 24' of a motor vehicle. Here, however, it is provided that a bumper 28 and blinds 29 extending behind a glass pane 2'''' are also integrated on this front end. A reflector 4'''' is arranged, again, in the way described in the introduction, and an inner lens 27' made of plastic is used.

I claim:

1. A headlamp having a first component part comprising a lens and a rearwardly projecting spacer, and a second component part comprising a reflector, characterized in that the two component parts each include peripherally corresponding upper, lower and side peripheral edges and labyrinth seal means are interposed between the component parts at the corresponding peripheral edges to provide a ventilating seal thereacross, the labyrinth seal means comprising interleaved webs and channels formed on the corresponding peripheral edges of the component parts such that the labyrinth seal means webs are formed on the peripheral edges of the spacer and the labyrinth seal means channels are formed on the peripheral edges of the reflector, and wherein one of the labyrinth seal means webs includes a partly cylindrical edge and one of the labyrinth seal means channels with which the one web is interleaved includes a partly cylindrical recess engaging the partly cylindrical edge to define a pivot axis.

2. A headlamp according to claim 1, wherein the partly cylindrical edge is retained in engagement with the partly cylindrical recess by means of a spring clip.

3. A headlamp according to claim 1, wherein the spacer is formed as a one-piece component part with a front end panel of a motor vehicle.

4. A headlamp according to claim 3, wherein the front end panel of the motor vehicle includes a bumper and slats or blinds.

5. A headlamp having a first component part comprising a lens and a rearwardly projecting spacer and a second component part comprising a reflector characterized in that the two component parts each include peripherally corresponding upper, lower and side peripheral edges and labyrinth seal means are interposed between the component parts at the corresponding peripheral edges to provide a ventilating seal thereacross, the labyrinth seal means comprising interleaved webs and channels formed on the corresponding peripheral edges of the component parts, and wherein some of the labyrinth seal means webs are formed on the upper and lower peripheral edges of the spacer which interleave with some of the labyrinth seal means channels formed on the corresponding upper and lower peripheral edges of the reflector and the remainder of the labyrinth seal means channels are formed on the side edges of the spacer which interleave with the remainder of the labyrinth seal means webs formed on the corresponding side edges of the reflector, one of the labyrinth seal means webs along the upper peripheral edge of the spacer having in its center an arcuate nose and the corresponding labyrinth seal means channel on the reflector having an arcuate cavity in which the nose is received, the nose and the cavity forming a pivotal axis for adjustment of the headlamp and held against one another by a spring clip.

* * * * *